United States Patent
Bouiller et al.

(10) Patent No.: US 9,200,594 B2
(45) Date of Patent: Dec. 1, 2015

(54) GAS TURBINE ENGINE HAVING FAN BLADES OF ADJUSTABLE PITCH WITH CYCLIC SETTING

(75) Inventors: Philippe Pierre Vincent Bouiller, Samoreau (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1121 days.

(21) Appl. No.: 13/203,353

(22) PCT Filed: Feb. 25, 2010

(86) PCT No.: PCT/EP2010/052417
§ 371 (c)(1),
(2), (4) Date: Nov. 23, 2011

(87) PCT Pub. No.: WO2010/097438
PCT Pub. Date: Sep. 2, 2010

(65) Prior Publication Data
US 2012/0055137 A1    Mar. 8, 2012

(30) Foreign Application Priority Data

Feb. 27, 2009 (FR) ..................................... 09 51269
Feb. 27, 2009 (FR) ..................................... 09 51270

(51) Int. Cl.
*F01D 7/00* (2006.01)
*F04D 29/36* (2006.01)
*F02K 3/06* (2006.01)

(52) U.S. Cl.
CPC ... *F02K 3/06* (2013.01); *F01D 7/00* (2013.01); *F04D 29/362* (2013.01); *F05D 2260/74* (2013.01); *Y02T 50/671* (2013.01); *Y02T 50/673* (2013.01)

(58) Field of Classification Search
CPC ........... F02K 3/06; F02K 3/062; F02K 3/065; F01D 7/00; F04D 29/362; F05D 2260/74; F03D 7/0224; B64C 11/30
USPC ......... 60/226.1, 262; 416/147, 155, 159, 160, 416/162, 164, 166, 167, 168 A, 40, 42, 43, 416/44, 27
See application file for complete search history.

(56) References Cited

U.S. PATENT DOCUMENTS

| 2,143,024 A | 1/1939 | Nemeth |
| 3,489,338 A * | 1/1970 | Davies et al. ................ 60/226.1 |

(Continued)

FOREIGN PATENT DOCUMENTS

| FR | 1 596 504 A | 6/1970 |
| FR | 2 126 109 A | 10/1972 |
| FR | 2 911 930 A | 8/2008 |

OTHER PUBLICATIONS

International Search Report issued Oct. 15, 2010, in Patent Application No. PCT/EP2010/052417.

(Continued)

*Primary Examiner* — William H Rodriguez
(74) *Attorney, Agent, or Firm* — Oblon, McClelland, Maier & Neustadt, L.L.P.

(57) ABSTRACT

A fan portion of a dual flow turbojet engine including a plurality of fan blades, a disk supporting the blades and configured to be rotated relative to a stator portion of the fan, along a longitudinal axis of the fan, and a system for setting the angle of attack associated with each fan blade, the systems configured such that the angle of attack of each blade varies according to a same setting law according to the angular position of the blade relative to the stator portion, along the longitudinal axis, the same setting law being periodic with a period of P=360°/n, where n is an integer at least equal to 1.

17 Claims, 4 Drawing Sheets

(56) References Cited

U.S. PATENT DOCUMENTS

| | | | |
|---|---|---|---|
| 3,549,272 A * | 12/1970 | Bouiller et al. | 416/166 |
| 3,720,060 A * | 3/1973 | Davies et al. | 60/226.1 |
| 3,870,434 A * | 3/1975 | Paulson | 416/160 |
| 3,876,334 A * | 4/1975 | Andrews | 416/160 |
| 3,893,789 A * | 7/1975 | Andrews | 416/160 |
| 3,994,128 A * | 11/1976 | Griswold et al. | 60/226.1 |
| 4,021,142 A * | 5/1977 | Violette | 416/167 |
| 4,082,378 A * | 4/1978 | Gries | 384/447 |
| 4,810,164 A * | 3/1989 | Wright | 415/129 |
| 4,968,217 A * | 11/1990 | Newton | 416/160 |
| 5,152,668 A * | 10/1992 | Bulman et al. | 416/129 |
| 5,174,716 A * | 12/1992 | Hora et al. | 416/26 |
| 5,595,474 A * | 1/1997 | Girard | 416/1 |
| 2008/0179455 A1 | 7/2008 | Gallet | |
| 2010/0092292 A1 * | 4/2010 | Nies et al. | 416/41 |
| 2011/0038728 A1 * | 2/2011 | Elkin et al. | 416/31 |
| 2011/0115233 A1 * | 5/2011 | Schroppel | 290/55 |
| 2011/0255972 A1 * | 10/2011 | Lew | 416/111 |
| 2012/0025525 A1 * | 2/2012 | Numajiri | 290/44 |
| 2012/0134829 A1 * | 5/2012 | Vance et al. | 416/155 |
| 2014/0205457 A1 * | 7/2014 | Curlier et al. | 416/160 |
| 2014/0307992 A1 | 10/2014 | Rousselin et al. | |

OTHER PUBLICATIONS

French Preliminary Search Report issued Oct. 15, 2010, in Patent Application No. PCT/EP2010/052417 with English translation.

* cited by examiner

GAS TURBINE ENGINE HAVING FAN BLADES OF ADJUSTABLE PITCH WITH CYCLIC SETTING

BACKGROUND OF THE INVENTION

1. Field of the Invention

The present invention relates to the field of dual flow turbojet engines, preferably for aircrafts.

2. Description of the Related Art

Traditionally, such a turbojet engine comprises a plurality of fan blades, and a disk for supporting the blades and capable of being rotated relative to a stator portion of the fan, along a longitudinal axis of the fan.

The fan blades are generally mounted fixed on the support disk, with a predetermined angle of attack that is identical for each of them. This solution is relatively satisfactory when the fan is supplied with air substantially uniform.

Nevertheless, certain turbojet engine designs can result in a non-uniform supply of air to the fan, continuously during the operation of the turbojet engine. This is in particular the case when the aerodynamic fairing delimiting the air intake of the turbojet engine covers part of the set of blades of said fan, towards the longitudinal axis of the fan. For information, these configurations are said to have "partially buried turbojet engines" and differ from the traditional solutions, in which the aerodynamic fairing delimiting the air intake runs along the entire fixed outer casing of the fan, without covering the blades thereof.

BRIEF SUMMARY OF THE INVENTION

To deal with cases where the fan is supplied with air non-uniformly, occasionally or continuously, the invention provides a dual flow turbojet engine fan portion, a disk for supporting the blades capable of being rotated relative to a fan stator portion, along a longitudinal fan axis, and comprising a system for setting angles of attack associated with each fan blade, these systems being designed so that the angle of attack of each blade varies according to a same setting law as a function of the angular position of the blade relative to the stator portion, along said longitudinal fan axis, said same setting law being periodic with period $P=360°/n$, with n corresponding to a whole number greater than or equal to 1.

In other words, the invention provides that the vanes successively go to any angular position of the stator portion with the same angle of attack, which follows a setting law the evolves during a complete fan revolution along its longitudinal axis.

This cyclic setting makes it possible to provide an extremely satisfactory response to cases where the fan is supplied heterogeneously with air, continuously or occasionally. In the latter case, for example during variations in the angle of attack of the aircraft or during turns, the variation of the angle of attack of the fan blades is not continuous, but automatically or manually activated only when the flight conditions translate a heterogeneous supply of air to the fan. This scenario is therefore preferably encountered with the traditional solutions in which the aerodynamic fairing delimiting the air intake runs along the entire fixed outer casing of the fan, without covering the blades thereof.

However, when the air supply of the fan is continuously heterogeneous, the variation of the angle of attack of the fan blades is also continuously activated. This for example, as mentioned above, involves cases where the turbojet engine is partially buried in the aircraft structure, preferably in the main wing.

Thus, in this preferred case of a partially buried turbojet engine, the unique setting law is preferably provided to so that when any one fan blade enters the covered zone, also called buried zone, its angle of attack is decreased so that it claims less air, thereby reducing the risks of pumping and drop in output. However, when it leaves said covered zone, its normal angle of attack is reestablished without any risk, since it is located in the air stream. Naturally, much more complex setting laws can be contemplated, and can be determined as a function of the constraints and needs encountered.

Preferably, said system for setting angles of attack is steered passively by rotating the disk supporting the blades relative to the fan stator portion, along said longitudinal axis of the fan. The passive nature here translates the fact that no additional energy source other than that of the rotation of the fan is used. However, an active steering design could be contemplated without going beyond the scope of the invention.

According to a preferred first embodiment of the invention, the passively steered system for setting the angle of attack comprises a lug arranged eccentrically on the foot of the concerned blade, a first toothed wheel centered on said longitudinal fan axis and fastened to the fan stator portion, as well as a second toothed wheel rotated along the longitudinal fan axis by the support disk, and mounted freely rotating on the latter along a wheel axis of rotation separate from said longitudinal fan axis, said second toothed wheel meshing with said first toothed wheel and being mechanically connected to said lug.

With this specific design, it is preferably provided that the systems for setting the angles of attack of all of the fan blades share the same first toothed wheel. This results in significant gains in terms of mass and bulk.

Preferably, said second toothed wheel is mechanically connected to said lug via a connecting rod.

Still preferably, it is done so that the first and second toothed wheels form a conical gear, i.e. they adopt tapered shapes whereof the axes intersect, preferably orthogonally.

According to a second preferred embodiment of the invention, said system for setting the angle of attack comprises a lug fixedly mounted eccentrically on the foot of the concerned blade, as well as a guide path fixed relative to the fan stator portion and arranged around said longitudinal fan axis, said guide path having a geometry making it possible to apply to said lug, during its rotational movement relative to the stator portion along the longitudinal axis, an additional movement parallel to said same axis, ensuring a variation of the angle of attack of the blade according to said setting law.

Here again, it is therefore provided that the blades successively go to any angular position of the stator portion with the same angle of attack, which follows a setting law that evolves during a complete revolution of the fan along its longitudinal axis.

This cyclic setting makes it possible to provide an extremely satisfactory response to cases in which the air supply for the fan is continuously heterogeneous, given that the variation of the angle of attack of the fan blades is also obtained continuously, owing to the cooperation between the lug and its guide path having a suitable geometry. This for example involves, as mentioned above, cases where the turbojet engine is partially buried in the structure of the aircraft, preferably in the main wing.

Thus, in this preferred case of a partially buried turbojet engine, the unique setting law is preferably provided so that when any fan blade enters the covered zone, also called buried zone, its angle of attack is decreased so that it claims less air, thereby reducing the risks of pumping and output drop. However, when it leaves this covered zone, its normal angle of attack is reestablished without any risk, since it is located in the stream of air. Naturally, much more complex setting laws can be contemplated, and can be determined as a function of the constraints and needs encountered.

As emerges from the preceding, said system for setting the angle of attack is steered passively by rotating the disk supporting the blades relative to the fan stator portion, along said longitudinal fan axis. The passive nature here translates the fact that no additional energy source other than that of the rotation of the fan is used. In fact, the rotation of the fan results in applying a rotational movement relative to the stator portion, along the longitudinal axis, to the lug of a given blade. During this rotational movement, the lug following the guide path, the specific geometry of which results in applying an additional movement to this lug parallel to the longitudinal axis, ensuring the desired variation of the angle of attack of the blade. In other words, the guide path serves to transform the rotational movement of the lug into an axial movement of the latter, relative to the stator portion.

With this specific design, it is preferably provided that the systems for setting angles of attack for all of the blades of the fan share the same guide path. It could nevertheless be otherwise, without going beyond the scope of the invention.

Preferably, said system for setting angles of attack also has a roller secured to said lug, slidingly housed in said guide path. Alternatively, the lug could itself be housed directly in the guide path, without going beyond the scope of the invention.

Preferably, said guide path assumes the form of a groove radially outwardly open. Its shape is then substantially annular centered on the longitudinal fan axis, while having an evolution of its position in the axial/longitudinal direction so as to apply said desired setting law.

Irrespective of the embodiment contemplated, preferably, said whole number n defining the period of the setting law is equal to 1, which translates a period equal to one revolution.

The invention also relates to a turbojet engine comprising a fan portion as described above.

Preferably, the turbojet engine is provided to be partially buried, i.e. it comprises an aerodynamic fairing delimiting the air intake of the turbojet engine and covering, when seen in the direction of the longitudinal fan axis, a portion of the set of blades of said fan. In other words, in this scenario, the surface in transverse-cross section of the air intake is smaller than a disk-shaped surface with a diameter corresponding to that of the rotary portion of the fan, the ratio between these two surfaces being able to be in the vicinity of 0.33.

BRIEF DESCRIPTION OF THE SEVERAL VIEWS OF THE DRAWINGS

Other advantages and features of the invention will appear in the non-limiting detailed description below.

This description will be done in reference to the appended drawings, in which.

DETAILED DESCRIPTION OF THE INVENTION

Figure 1:
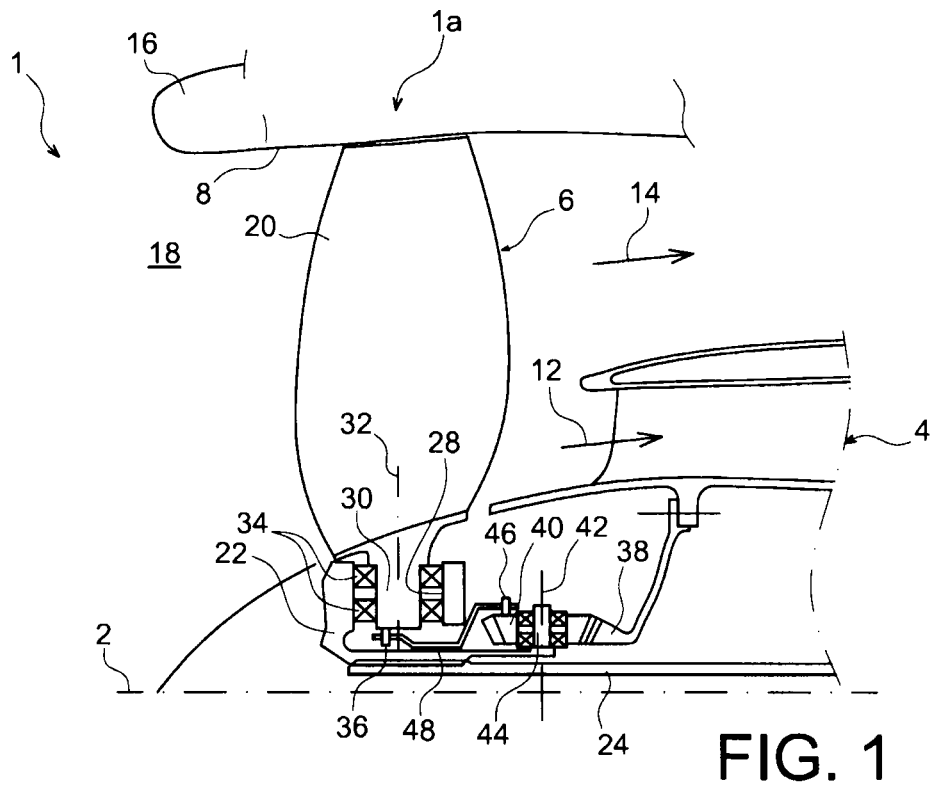
FIG. 1 shows a longitudinal half-cross-sectional view of a front portion of a turbojet engine according to a first preferred embodiment of the present invention.

FIG. 1 shows a front portion of a turbojet engine 1 according to a first preferred embodiment of the present invention. This front portion is essentially made up of a fan portion 1a, centered on a longitudinal axis 2 also corresponding to the turbojet engine. It globally comprises a stator portion 4, as well as a portion 6 rotatably mobile around said stator portion, along the axis 2. The stator portion 4 is fixed and comprises, inter alia, a fixed outer fan casing 8, secured to an intermediate casing making it possible to ensure the delimitation between the primary stream 12 and the secondary stream 14 of the turbojet engine. Moreover, this fixed outer fan casing 8 supports, toward the front, an aerodynamic fairing 16 delimiting the air inlet 18 of the turbojet engine.

The rotary portion 6 also comprises a plurality of fan blades 20, only one of which is visible in FIG. 1, as well as a blade support disk 22 centered on the axis 2. For information, the mobile portion 6 is rotated using a rotary driving shaft 24 centered on the axis 2, and meshing directly or via a gearbox with said support 22, also called hub. The latter has a plurality of orifices 28 spaced circumferentially apart from each other, each dedicated to the housing of one of the fan blades 20.

Thus, as shown for one of the blades 20 in FIG. 1, the orifice 28 receives the foot 30 of the blade so as to allow a rotation thereof along a blade pivot axis 32, preferably substantially radial. This is in particular allowed by the placement of rolling bearings 34 between the orifice 28 and the blade foot 30.

This rotary assembly of the blade 20 relative to the hub 22 along the axis 32 is provided to be able to steer the angle of attack of said blade, owing to a system for setting angles of attack that will now be described, and which is preferably substantially identical for each of the blades.

It first incorporates a lug 36 arranged on the blade foot 30 eccentrically relative to the pivot axis 32, and protruding radially inwardly.

Moreover, a first toothed wheel 38 is provided centered on the longitudinal axis 2 of the fan, and fastened to the stator portion 4. Preferably, this wheel 38, which assumes a substantially tapered shape, is shared by all of the setting systems equipping the blades of the fan.

The system for setting angles of attack also incorporates a second toothed wheel 40 rotated along the axis 2 by the support disk 22, and mounted freely rotating thereon along the wheel axis of rotation 42, secant and preferably orthogonal to the axis 2. A lug 44 is for example provided on the hub 42 to allow the freely rotating assembly of the second wheel 42 with a substantially tapered shape, which meshes directly or indirectly with the first toothed wheel 38. In this respect, a reduction ratio of 1 is preferably provided between the two wheels, so that one hub 22 revolution around the axis 2 creates a revolution of the second wheel 40 around its axis 42.

Furthermore, the second wheel 40 also fixedly supports a lug 46, eccentric relative to the axis of rotation 42 and radially protruding, and connected to the lug 36 by a connecting rod 48.

This system is steered passively, since the rotation of the mobile portion 6 of the fan results in making the second mobile wheel 40 mesh with the first fixed wheel 38, and therefore making it rotate around its axis of rotation 42, causing the connecting rod 48 actuating the eccentric lug 36 of the blade foot 30 in motion.

Figure 2:
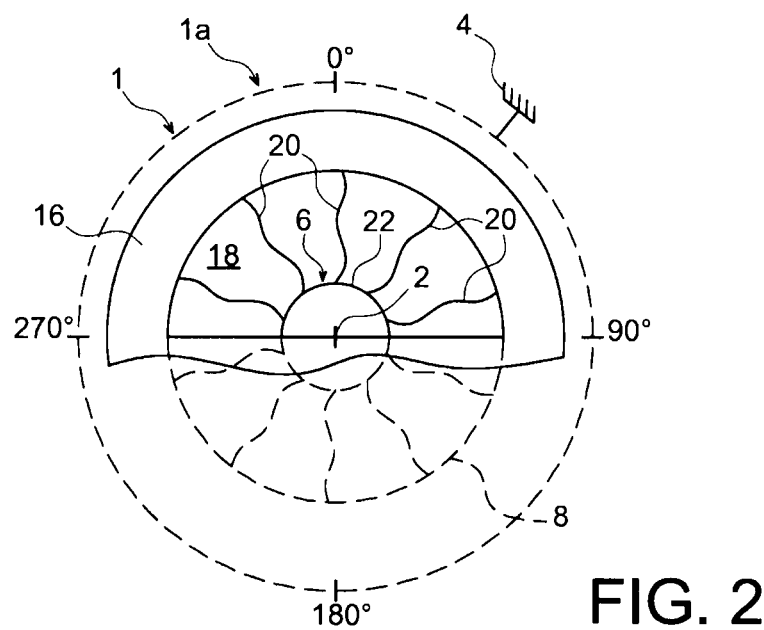
FIG. 2 shows a front view of the turbojet engine shown in FIG. 1.

This system for setting angles of attack is specifically designed so that the blade 20 to which it is connected has an angle of attack that varies according to a cyclic setting law, preferably with a period corresponding to one fan revolution. This setting law, which provides the angle of attack of the blade as a function of its angular position relative to the stator portion 4 along the axis 2, is the same for all of the blades 20 of the fan. It is determined as a function of the needs encountered. In the example shown in FIG. 2, the turbojet engine 1 is intended to be semi-buried in the structure of the aircraft, preferably in the main wing. Thus, seen from the front as shown in FIG. 2, the aerodynamic fairing 16 delimiting the air intake 18 covers the lower half of the set of blades 20.

Figure 3:
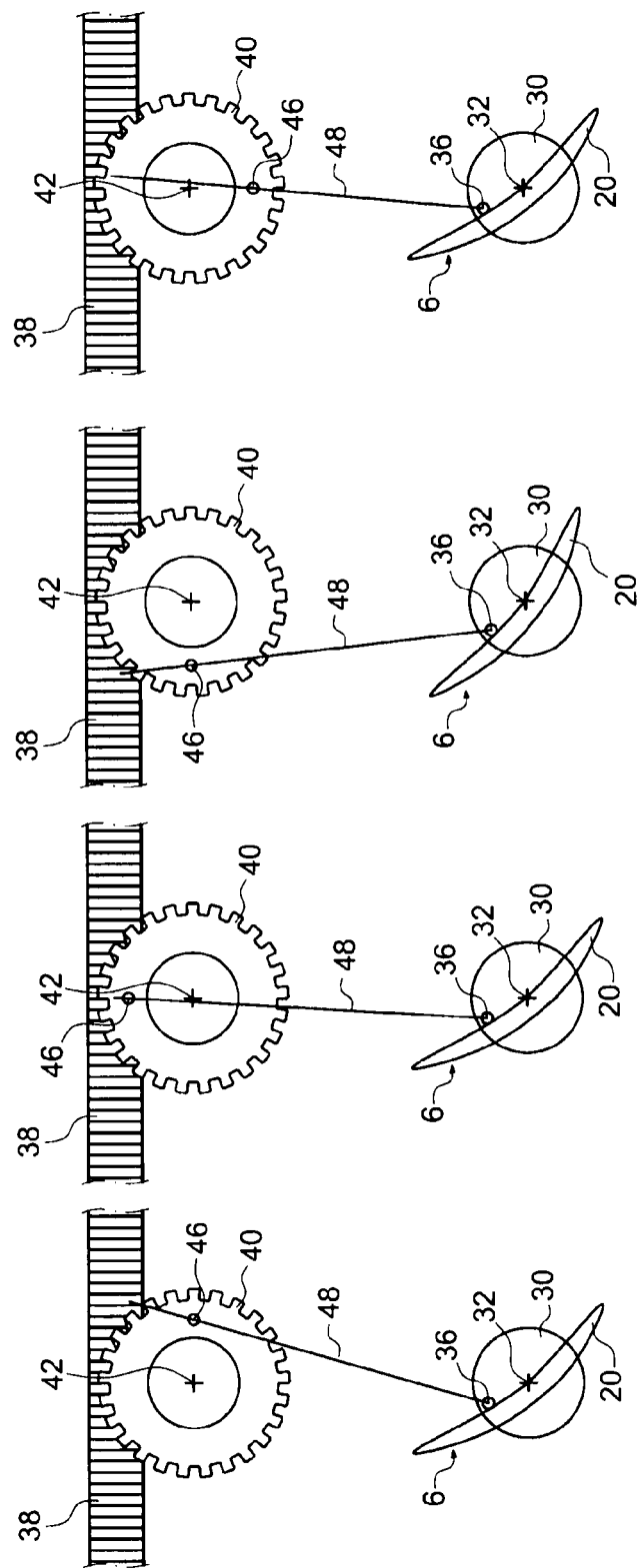
FIGS. 3a to 3d show a system for setting the angle of attack of one of the fan blades of the turbojet engine shown in FIGS. 1 and 2, in different configurations adopted during a revolution of said concerned blade.
Figure 4:
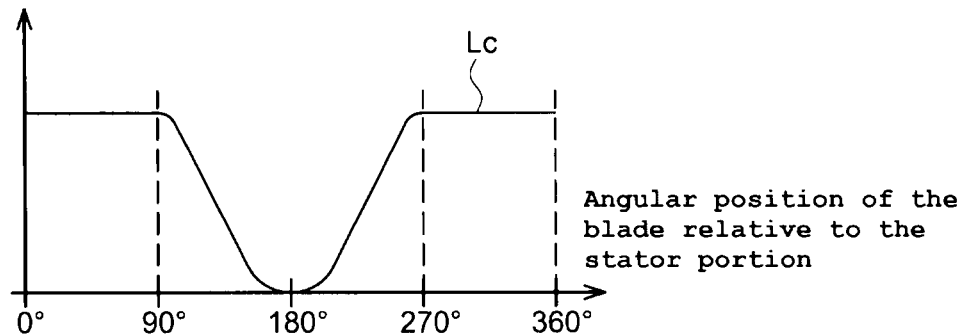
FIG. 4 shows a graph diagramming the setting law applied to said blade.

In this situation, the unique setting law Lc diagrammed in FIG. 4 is preferably provided so that when any blade 20 is in an angular position of 0° relative to the stator portion 4, it has a so-called normal angle of attack, which is preserved until it occupies an angular position close to 90°. FIGS. 3a and 3b respectively show the state of the setting system for the two angular positions of 0° and 90° of the blade. In these two figures, it is in fact possible to see that while the configuration of the setting system has been modified due to the meshing of the two wheels 38, 40 over a quarter revolution, the angle of attack of the blade remains invariable over this cycle portion.

From the angular position of 90° and up to its angular position of 180°, corresponding to 6:00, the angle of attack of the blade 20 is decreased, preferably to a null or nearly null value. During this portion of the cycle, the blade in question effectively passes through the covered/buried portion, and it is therefore done so that it claims less air so as to reduce the risks of pumping and output drop. Conversely, from the angular position of 180° and up to its angular position of 270° coinciding with the exit of covered/buried portion of the fan, the angle of attack of the blade 20 is increased until it again reaches its so-called normal value, which it then keeps until its angular position of 0°, also corresponding to 360°. In this respective, FIGS. 3c and 3d respectively show the state of the setting system for the two angular positions of 180° and 270° of the blade.

To obtain the desired setting law Lc, it is done here so that, as shown in FIGS. 3a to 3d, the lug 46 is slidingly mounted on the connecting rod 48, along the latter.

Naturally, the unique setting law Lc applied to all of the fan blades 20 could differ, but with a same air intake configuration 18, without going beyond the scope of the invention.

Figure 5:
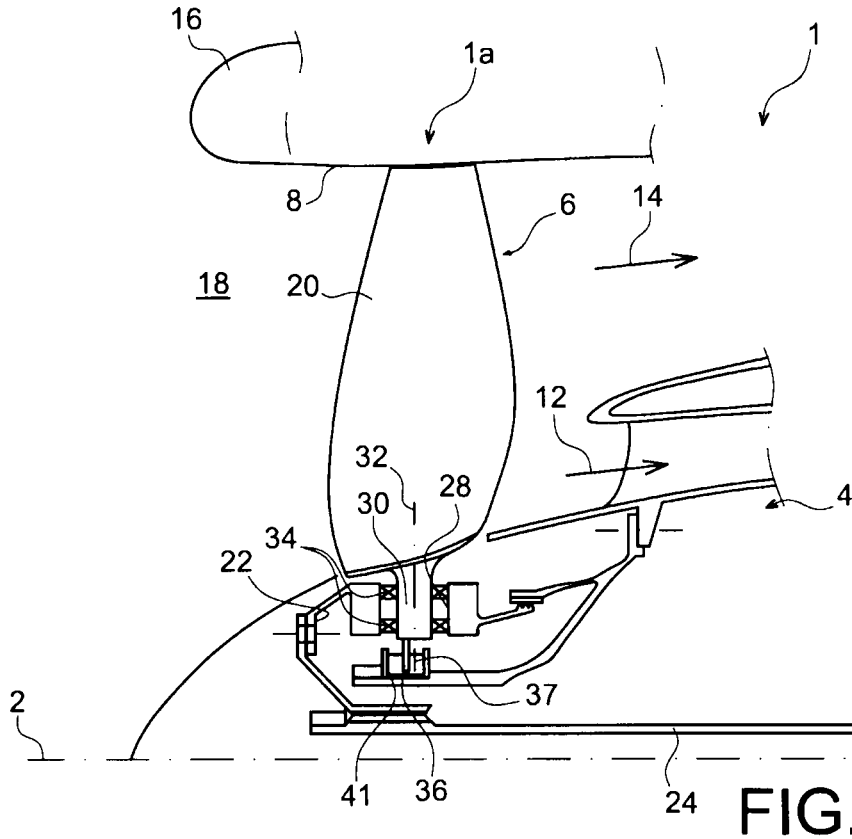
FIG. 5 shows a longitudinal half-cross-sectional view of a front portion of a turbojet engine according to a second preferred embodiment of the present invention.

FIG. 5 shows a front portion of a turbojet engine 1 according to a second preferred embodiment of the present invention. This second embodiment has similarities with the first embodiment described above. Moreover, in the figures, the elements bearing identical reference numbers correspond to identical of similar elements.

Here again, the front portion is essentially made up of a fan portion 1a, centered on a longitudinal axis 2 also corresponding to the axis of the turbojet engine. It globally comprises a stator portion 4, as well as a portion 6 rotatably mobile around said stator portion, along the axis 2. The stator portion 4 is fixed and comprises, inter alia, a fixed outer fan casing 8, secured to an intermediate casing making it possible to ensure the delimitation between the primary stream 12 and the secondary stream 14 of the turbojet engine. Moreover, this fixed outer fan casing 8 supports, towards the front, an aerodynamic fairing 16 delimiting the air intake 18 of the turbojet engine.

The rotary portion 6 comprises a plurality of fan blades 20, only one of which is visible in FIG. 5, as well as a disk supporting the blades 22 centered on the axis 2. For information, the mobile portion 6 is rotated via a rotary drive shaft 24 centered on the axis 2, and meshing directly or via a gearbox with said support 22, also called a hub. The latter has a plurality of orifices 28 circumferentially spaced apart from each other, each dedicated to the housing of one of the fan blades 20.

Thus, as shown for one of the blades 20 in FIG. 5, the orifice 28 receives the foot 30 of the blade so as to allow a rotation thereof along a blade pivot axis 32, preferably substantially radial. This is in particular allowed by the placement of rolling bearings 34 between the orifice 28 and the blade foot 30.

This rotary assembly of the blade 20 relative to the hub 22 along the axis 32 is provided to be able to steer the angle of attack of said blade, owing to a system for setting angles of attack that will now be described, and which is preferably substantially identical for each of the blades.

It first incorporates a lug 36 fixedly mounted on the blade foot 30, eccentrically relative to the pivot axis 32, while protruding radially inwardly. Its outer radial end is therefore secured to the foot 30, while its inner radial end preferably supports a roller 37.

Figure 6:
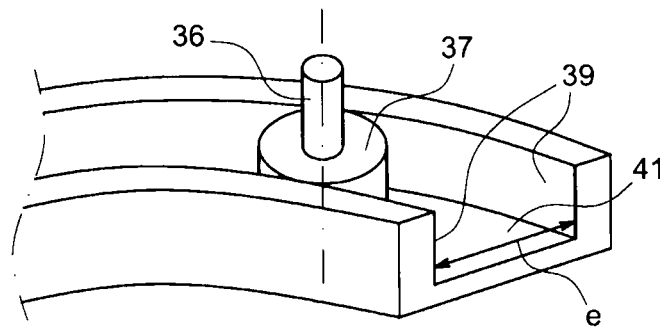
FIG. 6 shows a partial perspective view of part of the system for setting angles of attack shown in FIG. 5.

Moreover, a guide path 41 is provided stationary relative to the stator portion 4, this path running around the longitudinal fan axis 2. More precisely, the guide path 41, housing the cam follower 37, is a path following a closed line, and preferably adopts the form of a groove centered on the axis 2 and open radially outwardly. This is in particular visible in FIG. 6, which shows a portion of said path 41, which is axially delimited in the downstream and upstream direction respectively by two substantially annular flanks 39, whereof the constant spacing "e" is substantially identical to the diameter of the roller 37. Thus, in the second illustrated preferred embodiment, the path 41 is arranged radially inwardly relative to the foot of the blade 30, so that the roller 37 can be housed between the two flanks 39 serving for guiding thereof.

Preferably, this path 41 is shared by all of the setting systems equipping the blades of the fan, i.e. it houses a plurality of rollers 37 each associated with the lug 36 of a given blade.

One of the particularities of the preferred embodiment lies in the fact that the guide path 41 has a geometry making it possible to apply to the lug 36, during its rotational movement relative to the stator portion 4, an additional movement parallel to the axis 2, ensuring a variation in the angle of attack of the blade. In this way, this system is steered passively, since the rotation of the mobile portion 6 of the fan results in making the roller 37 run along the path 41, and thereby causing the additional movement of the lug 36 along the direction of the axis 2. To that end, the path 41 extends in the annular direction around the axis 2, but also in the direction of said axis so as to obtain the evolution of the desired setting.

The system for setting the angle of attack is specifically designed so that the blade 20 to which it is connected has an angle of attack that varies according to a cyclic setting law, preferably with a period corresponding to one revolution of the fan. This setting law, which yields the angle of attack of the blade as a function of its angular position relative to the stator portion 4 along the axis 2, is the same for all of the blades 20 of the fan. It is determined according to the needs encountered. Still in the example shown in FIG. 2, the turbojet engine 1 is intended to be semi-buried in the structure of the aircraft, preferably in the primary wing. Thus, in front view as visible in FIG. 2, the aerodynamic fairing 16 delimiting the air intake 18 covers the lower half of the set of blades 20.

Figure 7:
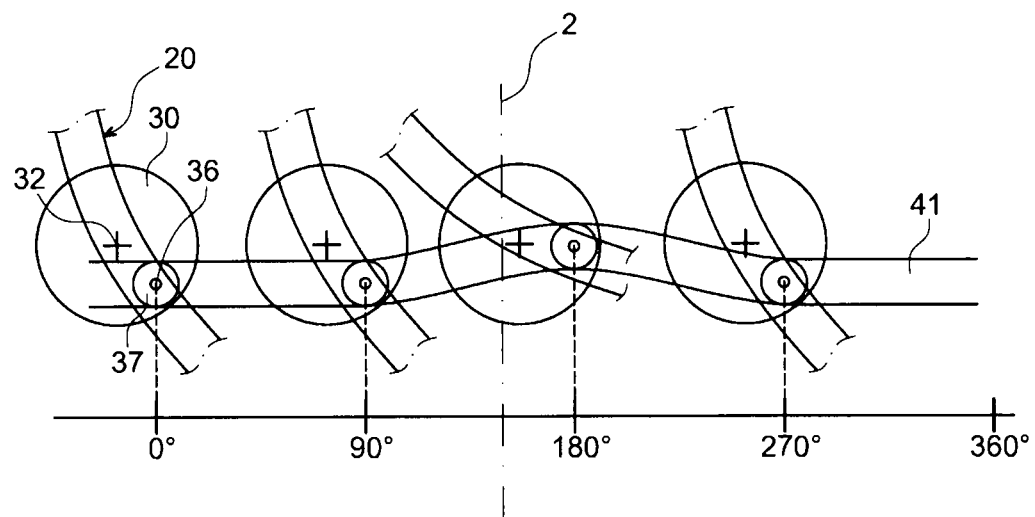
FIG. 7 shows a system for setting the angle of attack of one of the fan blades of the turbojet engine shown in FIG. 5, in different configurations adopted during a revolution of said concerned blade.

In this situation, the unique setting law Lc diagrammed in FIG. 4 is preferably provided so that when any blade 20 is located in an angular position of 0° relative to the stator portion 4, it has a so-called normal angle of attack, which is preserved until it occupies an angular position close to 90°. The two left illustrations in FIG. 7 respectively show the state of the setting system for the two angular positions of 0° and 90° of the blade. In this figure, to facilitate understanding, the guide path 41 has been shown in a developed manner in the plane, whereas it is recalled that the latter has a globally annular shape.

It can be seen that between these two first positions, the path 41 does not have any evolution in the axial direction, so that the angle of attack of the blade is not modified during this first quarter revolution.

From the angular position 90° and up to its angular position of 180°, corresponding to 6:00, the incidence of the blade 20 is decreased, preferably up to a null or nearly null value. During this portion of the cycle, the blade in question effectively passes through the covered/buried portion, and it is therefore done so that it claims less air so as to reduce the risks of pumping and output drop. Conversely, from the angular position of 180° and up to its angular position 270° coinciding with the exit of the covered/buried portion of the fan, the angle of attack of the blade 20 is increased until it again reaches its so-called normal value, which it then keeps until its angular position of 0°, also corresponding to 360°. In this respect, the two right illustrations in FIG. 3 respectively show the state of the setting system for the two angular positions of 180° and 270° of the blade.

It is thus possible to see that between the 90° and 180° positions, the path 41 becomes gradually offset in the downstream direction in the direction of the axis 2, ensuring the additional movement of the lug in this same direction. Consequently, during this quarter revolution, the setting of the blade in fact evolves while gradually closing. However, it can be seen that between the 180° and 270° positions, the path becomes progressively offset in the upstream direction in the direction of the axis 2, ensuring the additional movement of the lug 36 in this same direction. Consequently, during this quarter revolution, the setting of the blade evolves, re-opening again until its normal angle of attack position.

Lastly, it is possible to see that between the 270° and 360° positions, the path 41 does not have any evolution in the axial direction, so that the angle of attack of the blade is not modified during this last quarter revolution.

Naturally, the unique setting law Lc applied to all of the fan blades 20 could differ, but with a same air intake configuration 18, without going beyond the scope of the invention.

Of course, various modifications can be made by one skilled in the art to the invention just described, solely as non-limiting examples.

The invention claimed is:

1. A dual flow turbojet engine fan portion comprising:
a plurality of fan blades;
a support disk to support the blades and configured to be rotated relative to a fan stator portion, along a longitudinal fan axis; and
a system for setting angles of attack associated with each fan blade so that an angle of attack of each blade varies according to a same setting law which varies the angle of attack of the fan blade as a function of an angular position of the blade relative to the fan stator portion along the longitudinal fan axis, and the same setting law being periodic,
wherein the system for setting the angles of attack is configured such that at each instant time, at least two fan blades have a different angle of attack.

2. The fan portion according to claim 1, wherein the system for setting angles of attack is steered passively by rotating the support disk supporting the blades relative to the fan stator portion, along the longitudinal axis of the fan.

3. The fan portion according to claim 2, wherein the system for setting the angles of attack comprises a lug arranged eccentrically on a foot of a concerned blade, a first toothed wheel centered on the longitudinal fan axis and fastened to the fan stator portion, and a second toothed wheel rotated along the longitudinal fan axis by the support disk, and mounted freely rotating on the support disk along a wheel axis of rotation separate from the longitudinal fan axis, the second toothed wheel meshing with the first toothed wheel and being mechanically connected to the lug.

4. The fan portion according to claim 3, wherein the system for setting the angles of attack of all of the fan blades share the first toothed wheel.

5. The fan portion according to claim 3, wherein the second toothed wheel is mechanically connected to the lug via a connecting rod.

6. The fan portion according to claim 5, wherein the connecting rod is mechanically connected to the second toothed wheel via another lug provided on the second toothed wheel.

7. The fan portion according to claim 3, wherein the first and second toothed wheels form a conical gear.

8. The fan portion according to claim 1, wherein the system for setting the angles of attack comprises:
a lug fixedly mounted eccentrically on a foot of each blade, and
a guide path fixed relative to the fan stator portion and arranged around the longitudinal fan axis, the guide path presenting a geometry such that during rotational movement of the lug relative to the fan stator portion along the longitudinal fan axis, an additional movement parallel to the longitudinal fan axis is applied to the lug so that the angle of attack of the blade varies according to the same setting law.

9. The fan portion according to claim 8, wherein the system for setting the angles of attack further includes a roller secured to the lug, slidingly housed in the guide path.

10. The fan portion according to claim 8, wherein the guide path assumes a form of a groove radially outwardly open.

11. The fan portion according to claim 8, wherein the system for setting the angles of attack for all of the fan blades share a same guide path.

12. The fan portion according to claim 8, wherein the support disk includes a plurality of orifices circumferentially spaced around the support disk, each orifice including a bearing in which the foot of one of the fan blades is placed.

13. A turbojet engine comprising a fan portion according to claim 1.

14. The turbojet engine according to claim 13, further comprising an aerodynamic fairing delimiting the air intake of the turbojet engine and covering, when seen in a direction of the longitudinal fan axis, a portion of the plurality of fan blades.

15. The fan portion according to claim 1, wherein the function of the same setting law is that the angle of attack is at a predetermined angle of attack when the angular position of the blade relative to the stator portion moves from 0° to 90°, the angle of attack decreases from the predetermined angle of attack to substantially zero when the angular position of the blade relative to the stator portion moves from 90° to 180°, the angle of attack increases from substantially zero to the predetermined angle of attack when the angular position of the blade relative to the stator portion moves from 180° to 270°, and the angle of attack is the predetermined angle of attack when the angular position of the blade relative to the stator portion moves from 270° to 360°.

16. The fan portion according to claim 1, wherein the support disk includes a plurality of orifices circumferentially spaced around the support disk, each orifice including a bearing in which a foot of one of the fan blades is placed.

17. The fan portion according to claim 1, wherein the system for setting the angles of attack includes an operating element fastened to the fan stator portion.

\* \* \* \* \*